United States Patent
Taylor

(10) Patent No.: US 8,814,048 B2
(45) Date of Patent: Aug. 26, 2014

(54) CONTENT IDENTIFICATION AND DISTRIBUTION

(71) Applicant: Zappar Limited, London (GB)

(72) Inventor: Simon John Taylor, Stanmore (GB)

( * ) Notice: Subject to any disclaimer, the term of this patent is extended or adjusted under 35 U.S.C. 154(b) by 0 days.

(21) Appl. No.: 13/725,086

(22) Filed: Dec. 21, 2012

(65) Prior Publication Data

US 2013/0162676 A1 Jun. 27, 2013

(30) Foreign Application Priority Data

Dec. 23, 2011 (GB) .................................. 1122284.1

(51) Int. Cl.
*G06K 7/10* (2006.01)
*G06T 7/00* (2006.01)

(52) U.S. Cl.
CPC ............... *G06T 7/004* (2013.01); *G06T 7/0046* (2013.01); *G06T 2207/30204* (2013.01)
USPC ..................... 235/462.09; 235/435

(58) Field of Classification Search
USPC ............................... 235/462.09, 435; 345/633
See application file for complete search history.

(56) References Cited

U.S. PATENT DOCUMENTS

| 6,866,199 | B1 | 3/2005 | Keech et al. |
| 2003/0076980 | A1 | 4/2003 | Zhang et al. |
| 2004/0046779 | A1 | 3/2004 | Asano et al. |
| 2009/0310874 | A1 | 12/2009 | Dixon et al. |
| 2010/0082487 | A1 | 4/2010 | Nelsen |
| 2010/0149347 | A1* | 6/2010 | Kim et al. .................. 348/207.1 |
| 2011/0135160 | A1* | 6/2011 | Sagan et al. .................. 382/108 |

FOREIGN PATENT DOCUMENTS

EP 1650695 4/2006

OTHER PUBLICATIONS

International Property Office, Search Report for GB Application No. 1122284.1, Apr. 23, 2012.

* cited by examiner

*Primary Examiner* — Sonji Johnson
(74) *Attorney, Agent, or Firm* — LeonardPatel PC

(57) ABSTRACT

The invention provides an identifier system for computing identity information from image data. At least part of the image data is representative of an identifier. The identifier comprises a location element and encoded data associated with the location element. The identifier system comprises computer interpretable reference data corresponding to the identifier. The reference data is suitable for use in feature matching to determine a location and an orientation of the location element in the image data—thereby to locate the encoded data in the image data for subsequent decoding into the identity information The invention also provides a computer implemented method of presenting an augmented reality view of a physical article using the identifier system.

17 Claims, 7 Drawing Sheets

CONTENT IDENTIFICATION AND DISTRIBUTION

REFERENCES TO OTHER APPLICATIONS

The present application claims priority from UK patent application number GB1122284.1 filed on 23 Dec. 2011.

FIELD OF THE INVENTION

The present invention relates to augmented reality content distribution systems, to methods of presenting an augmented reality view of a physical article, to identifier systems for computing identity information from image data, and to methods of locating an identifier in image data.

BACKGROUND

Augmented Reality ('AR') is a technology that superimposes imagery, such as computer-generated imagery, onto a view of the real world displayed in real-time on a display of a computing device, so as to produce a composite view.

In some cases, the superimposed imagery in the composite view should appear to interact with one or more elements of the displayed real-world view. For example, if a displayed real-world view contains a tree, the corresponding composite view may include superimposed imagery of birds which appear to be perching on branches of the tree.

AR and its applications have been researched for decades, but since portable computing devices such as the iPhone® have become widely used, numerous AR software applications (or 'apps') for these devices have been developed.

One technical consideration relating to deployment of AR applications is how a portable computing device user obtains the superimposed imagery corresponding to a real-world view. One approach is to apply an identifier to a real-world physical article, which lets the user know that there is superimposed imagery corresponding to a real-world view containing the article. The identifier may simply be a written statement informing the user that the superimposed imagery is available, and how it can be obtained. The identifier may comprise a machine-interpretable code containing information about how the superimposed imagery can be obtained.

SUMMARY

A first aspect of the present invention provides an identifier system for computing identity information from image data, at least part of the image data being representative of an identifier, the identifier comprising a location element and encoded data associated with the location element, the identifier system comprising computer interpretable reference data corresponding to the identifier, the reference data being suitable for use in feature matching to determine a location and an orientation of the location element in the image data, and thereby to locate the encoded data in the image data for subsequent decoding into the identity information.

In such an identifier system, the location element may take a variety of different forms. For example, it may comprise a company logo, and the encoded data may comprise a decodable pattern forming a border around the logo. In this way, there is provided greater generality of design than with existing code schemes, such as QR codes, datamatrix etc. The location determination technique used in this invention is technically distinct from location determination techniques used in existing code schemes, enabling use of complex or irregular or non-rectangular location elements.

A location element might be considered complex if, for example, it is a detailed design such as a brand identifier rather than a simple primitive such as a filled single-colour square. This invention does not specify a particular design of location element, but rather allows many designs and logos to be suitable for use as a location element in a barcode scheme. For example, the Starbucks® logo would be a suitable location element for use within the system described by the present invention. The identifier system of this invention is designed to operate efficiently with a general, real world image by virtue of being able to detect features that occur in such natural images or logos, such as a variety of corners, edges, blobs etc.

In some embodiments, the encoded data is associated with the location element in the sense that its location relative to the location element is defined. Because the encoded data is associated with the location element, i.e. because its location relative to the location element is known, it can be located in the image data by reference to the location and orientation of the location element.

In this invention, the location element is not constrained to be a predefined shape, such as a square or rectangle. In particular, as is the case with QR codes, and data matrices, it is not constrained to have a specific finder pattern in a specific spatial relationship relative to further data.

Preferably, the location element is not rotationally symmetrical—as a result any ambiguity about the orientation of the location element during the detection phase is removed.

Optionally, the reference data comprises a reference image of the location element, and optionally a further reference image of the location element, each reference image being associated with a different combination of scale and orientation of the location element. It is noted that each reference image may be associated with the same scale.

Optionally, the reference data comprises a reference model of at least part of the location element, and optionally a further model of at least part of the location element, each of the reference models being associated with a different combination of scale and orientation of the location element.

In this context, a model of a part of the location element is a simplified representation of the image data which represents the part of the location element. It may be a bit mask or other representation by which the part of the location element may be identified in image data. For example, if the part of the location element is a corner then the model thereof may be a bit mask suitable for identifying the specific corner in image data. Other suitable models will be apparent to those skilled in the art. Prior to this identifying step the system may detect candidate corners in the image, e.g. all possible locations in the image that look like corners, or could be corners.

Optionally, the reference data comprises a sparse sample of the reference image, or respective sparse samples of the reference images, each sparse sample being suitable for use, with a corresponding sparse sample of the location element of the image data, in an optimisation algorithm to identify a change of scale and/or orientation for fitting the reference image onto the location element of the image data or vice versa.

Optionally, the reference data comprises decoding information which specifies a location relative to the location element from which the encoded data can be obtained.

Optionally, the decoding information specifies one or more decoding reference values for comparison with the encoded data in order to decode it into the identity information.

The invention also provides a computer readable medium having encoded therein an identifier system as described above.

A second aspect of the invention provides a computer implemented method of locating an identifier in image data, the identifier comprising a location element and encoded data associated with the location element, the method comprising: receiving the image data; receiving computer interpretable reference data corresponding to the identifier; using feature matching based on the reference data to determine a location and a scale and orientation of the location element in the received image data; using the determined location, scale and orientation of the location element to locate the encoded data for subsequent decoding into identity information.

Optionally, the reference data comprises a reference model of at least part of the location element. The at least part of the location element may be a feature which is detectable in a reference image of the location element; for example, it may comprise a corner or an edge.

Optionally, the feature matching comprises obtaining a model of a part of the received image data and comparing it with the reference model to determine whether it matches the reference model. The part of the received image data may be a feature which is detectable in the received image data; for example, it may comprise a corner or an edge. The model is of the image data surrounding the corner, so it can be used to identify exactly which of the candidate reference corners may be present in the image data.

Optionally, the reference data comprises a further reference model of said at least part of the location element, each of the reference models corresponding to a different combination of scale and orientation of the location element. Optionally, the feature matching comprises comparing the model of a part of the received image data with the further reference model to determine whether it matches the further reference model.

Optionally, the feature matching comprises: disregarding a potential match in response to determining that the model of a part of the received image data does not match the reference model, or the further reference model. It will be appreciated that a feature (such as a corner) detected in the received image data may have many potential matches with similar features in the reference images, until a comparison shows which of them are not matches. The part of the received image data has a potential match with the at least part of the location element represented by the reference model, which may be disregarded in response to determining that the obtained model and the reference model do not match. Similarly, there is another potential match between the part of the received image data and the at least part of the location element represented by the further reference model, which may be disregarded in response to determining that the obtained model and the further reference model do not match. Accordingly, disregarding a potential match comprises identifying a 'non-match'.

Optionally, the reference data comprises a reference image of the location element. Optionally, the feature matching comprises comparing a part of the received image data with image data from the reference image to determine whether it matches the reference image.

Optionally, the reference data comprises a further reference image of the location element, each of the reference images corresponding to a different combination of scale and orientation of the location element. Optionally, the feature matching comprises comparing the part of the received image data with image data from the further reference image to determine whether it matches the further reference image.

Optionally, the reference image corresponds to the reference model and the part of the received image data is compared with the image data from the reference image only if the potential match between it and the reference model has not already been disregarded. Optionally, the further reference image corresponds to the further reference model and the part of the received image data is compared with the image data from the further reference image only if the potential match between it and the further reference model has not already been disregarded.

Optionally, the method comprises deriving the location of the location element from the location of the part of the received image data. The location may be so derived if the model of the part of the received image data was determined to match the reference model, or the further reference model, such that the location element was reliably identified in the received image data. The location may be so derived if the part of the received image data was determined to match the reference image, or the further reference image, for example after a direct comparison of the part of the received image data with the reference image, or the further reference image, resulted in a similarity score below a threshold.

Optionally, the method comprises deriving the scale and orientation of the location element from the scale and orientation associated with the reference model, or the further reference model, if the obtained model of the part of the received image data was determined to match the reference model, or the further reference model, respectively.

Optionally, the method comprises deriving the scale and orientation of the location element from the scale and orientation associated with the reference image, or the further reference image, if the part of the received image data was determined to match the reference image, or the further reference image, respectively.

Optionally, determining the scale and orientation of the location element comprises: using an optimisation algorithm to change the derived scale and/or orientation to fit the location element of the received image data onto a matching reference image, the matching reference image being whichever one of the reference images was determined to match the part of the received image data and/or the reference image corresponding to whichever one of the reference models was determined to match the model of the part of the received image data.

Optionally, a goal of the optimisation algorithm is to determine a change of scale and/or orientation which would reduce to zero a measure of similarity, such as the sum of squared differences, between the matching reference image and the location element of the received image data.

The invention also provides a computer readable medium comprising computer interpretable instructions arranged to, when executed by a computer processor, cause the processor to carry out the method described above. The invention also provides a computer apparatus comprising such a computer readable medium and a computer processor arranged to receive and execute the computer interpretable instructions from the computer readable medium. The computer apparatus may comprise a smartphone.

A third aspect of the invention provides a computer implemented method of presenting an augmented reality view of a physical article, comprising: receiving image data representative of a physical article for which augmented reality content is available; determining an identity of the augmented reality content; sending a request for the augmented reality content, the request including an indication of the determined identity; receiving a response to the request, the response comprising the augmented reality content; and presenting an augmented reality view of the physical article, based on the image data and the augmented reality content.

Optionally, the physical article includes an identifier. Optionally, the image data comprises data representative of the identifier. Optionally, determining an identity of the augmented reality content comprises computing identity information from the data representative of the identifier.

Optionally, the identifier comprises an identifier of the identifier system as provided by the first aspect of the present invention, and computing the identity information comprises locating the identifier in accordance with a method according to the second aspect of the present invention and decoding the resulting encoded data into identity information.

Optionally, the physical article is one of: a poster; a greetings card; a business card; and a garment.

Optionally, the augmented reality content is responsive to a user input. Optionally, presenting an augmented reality view of the physical article comprises: presenting an invitation for a user to provide the user input; and varying the presented augmented reality view in response to receipt of the user input.

The invention also provides a computer readable medium comprising computer interpretable instructions which when executed by a computer processor cause the computer processor to carry out a method according to the third aspect of the present invention. The invention also provides a computer apparatus comprising such a computer readable medium, and a computer processor arranged to receive and execute the computer interpretable instructions from the computer readable medium.

A fourth aspect of the invention provides an augmented reality content distribution system comprising at least one computer apparatus, having a processor and a memory arranged to store instructions which when executed by the processor cause the computer apparatus to carry out the method of the third aspect of the invention, and a server, the server being arranged to: receive a request for augmented reality content, the request including an indication of the identity of the augmented reality content; retrieve the augmented reality content using the indication of its identity; and send a response to the request, the response comprising the augmented reality content.

Optionally, the server has stored thereon application software for sending to the computer apparatus, the application software comprising computer interpretable instructions which when executed by a computer processor cause the computer processor to carry out a method according to the third aspect of the present invention.

Optionally, the server has stored thereon an identifier system according to the first aspect of the present invention.

Optionally, the server has stored thereon a plurality of identifier systems according to claims 1 to 8, each of the identifier systems corresponding to a different identifier.

BRIEF DESCRIPTION OF THE DRAWINGS

Preferred embodiments of the present invention will now be described, by way of example only, with reference to the accompanying drawings of which.

DETAILED DESCRIPTION OF THE DRAWINGS

Figure 1:
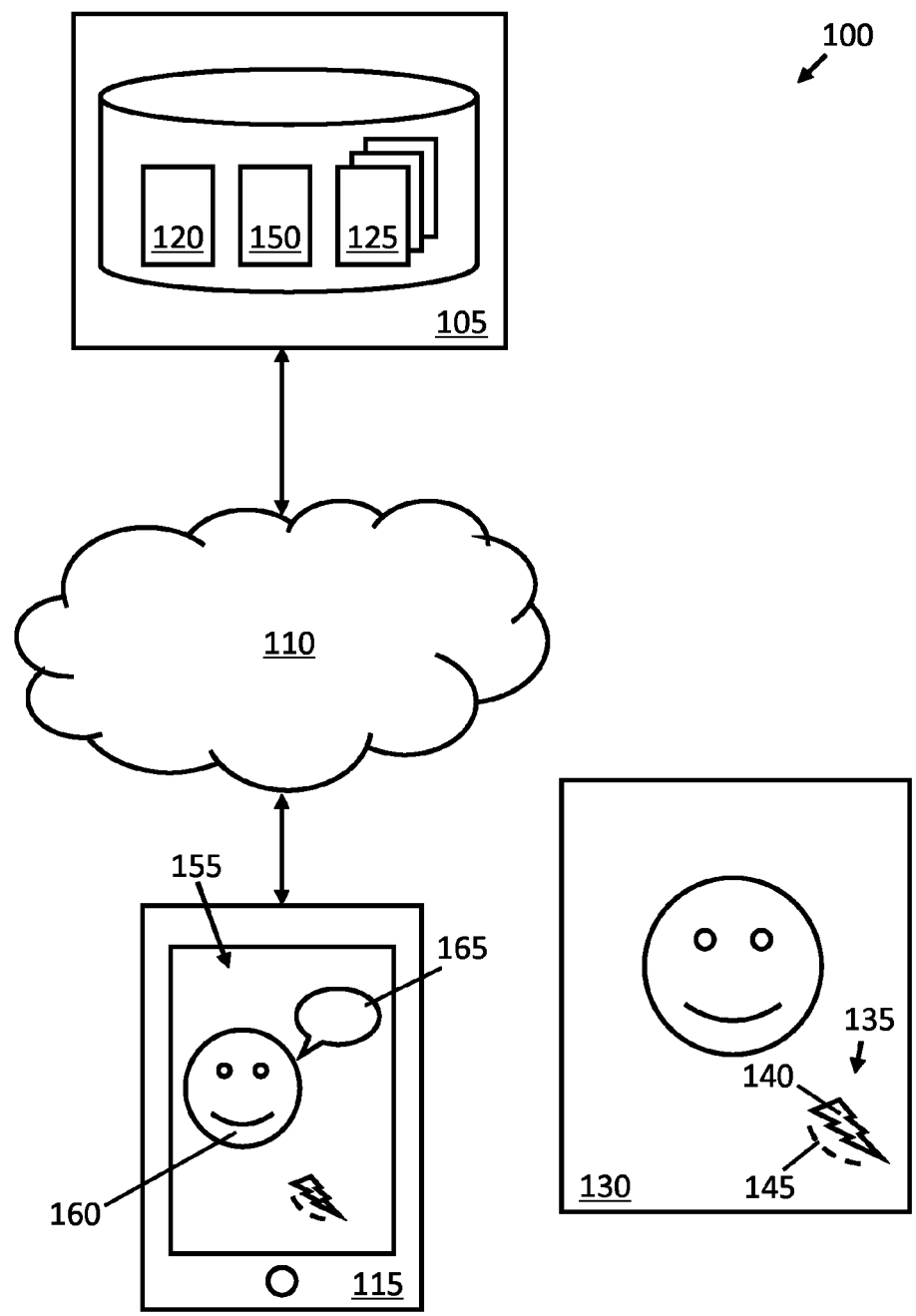
FIG. 1 shows an augmented reality content distribution system in accordance with an embodiment of the present invention.

FIG. 1 shows a block diagram of an embodiment of an augmented reality ('AR') content distribution system 100 comprising a server 105, a communications network 110 and at least one client device 115.

The server 105 may comprise a plurality of servers, and/or may include one or more hardware processors. In some embodiments, the server 105 also includes a computer-readable medium having encoded thereon data elements and program instructions which, when executed by the one or more processors, cause the server 105 to perform the operations described herein. Suitable computer readable media include magnetic storage media such as hard disk drives, optical storage media such as optical discs, and solid state storage such as flash-memory devices.

The communications network 110 may comprise one or more private networks such as a LAN and/or a WAN, and/or a public network such as the Internet.

Figure 4:
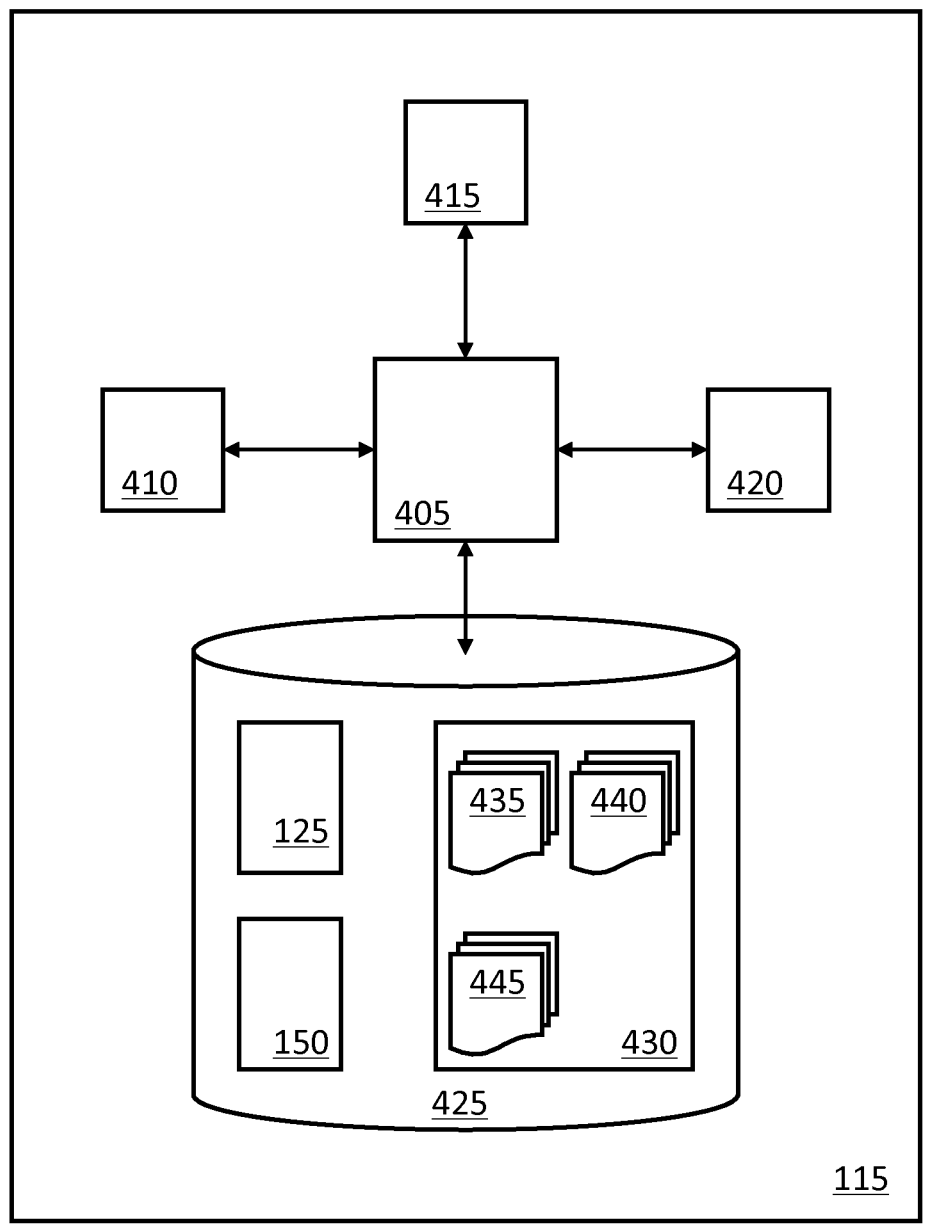
FIG. 4 is a schematic representation showing the components of the client device which is part of the system shown in FIG. 1.

The client device 115 may be any suitable computer apparatus, such as a personal computer, a media player, a handheld computer, a smartphone or other wireless communications device, a personal digital assistant ('PDA'), or any other device capable of processing AR content 125. In this embodiment, as shown in FIG. 4, the client device 115 comprises computer processor 405 operatively coupled to a display 410, a camera 415, a user input device 420 and a memory 425.

A user may browse a content site 120, via his or her client device 115, for AR content 125 associated with a physical article 130. For instance, he or she may notice a physical article bearing an indication that it may be 'brought to life' by means of augmented reality, and may access the content site 120 in order to locate and download the relevant AR content 125.

AR content 125 can be any suitable computer-interpretable content and preferably includes audio data, video data, and images in any of a number of suitable formats.

Different versions of the AR content 125 may have been generated, each being optimized for use with a different client device 115 in order to take account of the fact that different client devices 115 have different capabilities and may be used in different network environments. The different versions may correspond to different distribution profiles, which may be based upon predetermined requirements for the distribution of AR content 125. For example, a specific format may be used for AR content 125 in order to take advantage of device-specific capabilities, to optimize for different data rates in different network environments, and/or to target a specific operating system/platform of a client device 115.

The content site 120, which may be accessible via the public Internet, may include links to the AR content 125 stored on the server 105. A single network identifier may point to multiple versions of AR content 125. The server 105 may be arranged to select a most appropriate version of AR content 125 requested via a client device 115.

The physical article 130 may be practically anything with which a user might want to interact via augmented reality. For example, the physical article may be one of, or any suitable combination of: a poster; a greetings card; a business card; a newspaper; a magazine; a map; an audio CD cover; a DVD or BD cover; and a garment, such as a T-shirt.

The physical article 130 may comprise a visible identifier 135. The identifier 135 may comprise a location element 140, and encoded data 145 associated with the location element 140. A method of computing identity information from the encoded data will be described below, with reference to FIGS. 5 to 7.

The content distribution system 100 enables a user to obtain AR content 125 associated with the physical article 130, and to present an augmented reality view 155 of the physical article 130 on a display 410 of the client device 115, based on the AR content 125.

The augmented reality view 155 comprises a real-world component 160 and an AR component 165. As shown in FIG. 1, the physical article 130 may be a poster on which is shown a smiley face; the augmented reality view 155 of the poster 130 comprises a representation of the smiley face 160 and a speech bubble 165 which appears to hover next to the smiley face 160.

Figure 2:
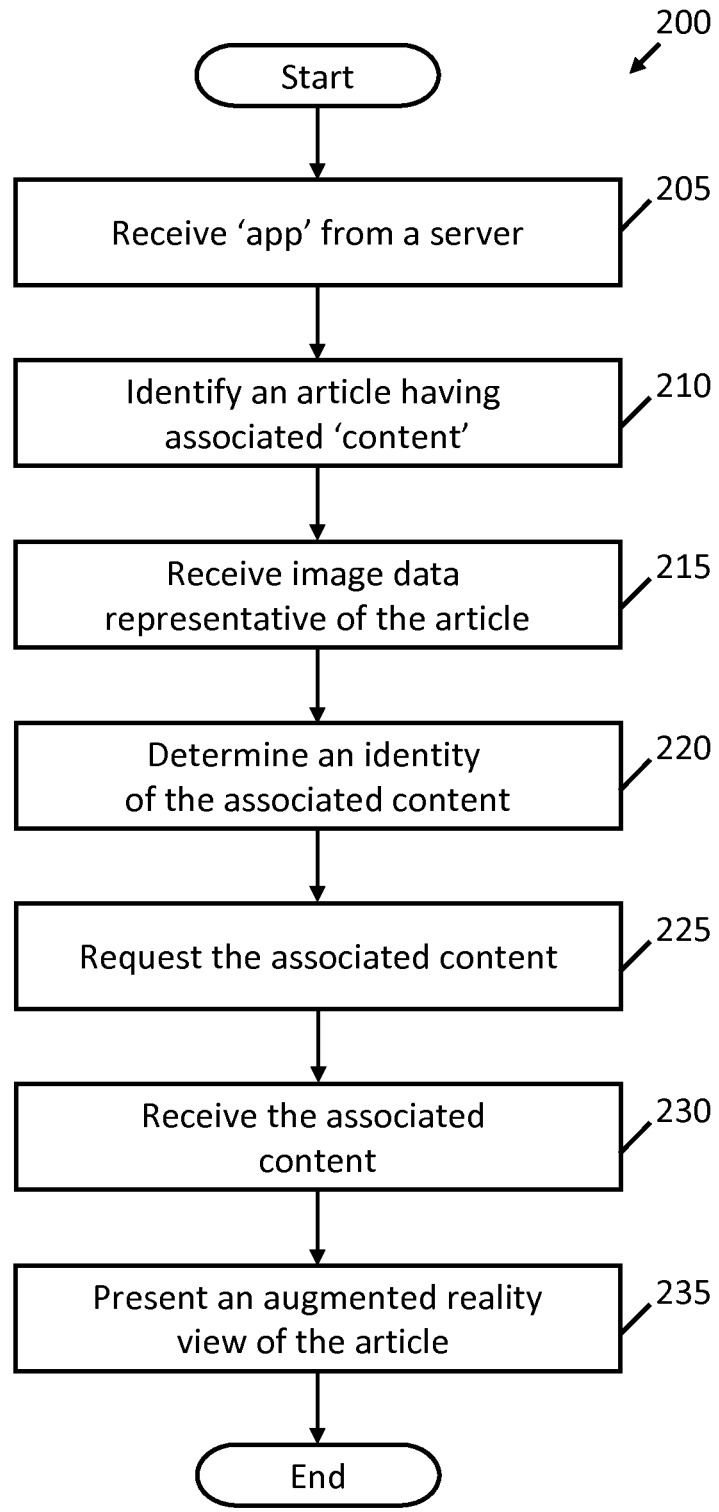
FIG. 2 is a flow chart which shows a method of presenting an augmented reality view of a physical article in accordance with an embodiment of the present invention.
Figure 3:
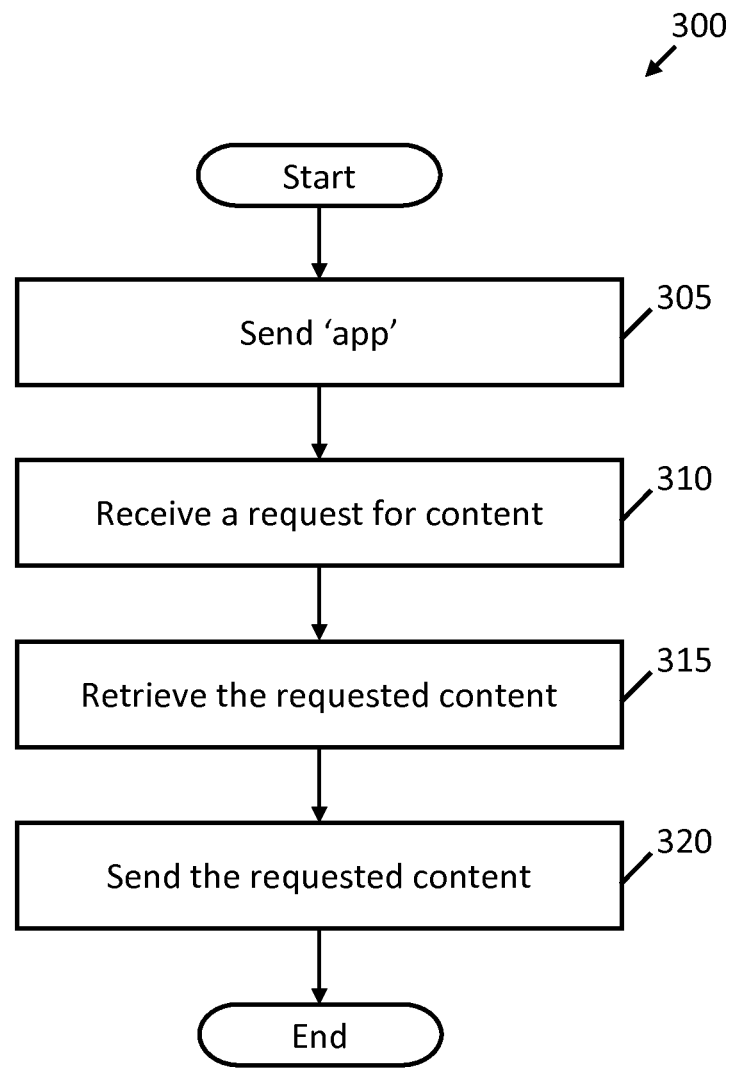
FIG. 3 is a flow chart which shows a method of distributing augmented reality content in accordance with an embodiment of the present invention.

With reference to FIGS. 2, 3 and 4, the client device 115 may receive (step 205) application software ('app') 150, which is sent (step 305) from the server 105. Alternatively, the app 150 may already be stored on the client device 115, in which case steps 205 and 305 can be omitted.

Firstly, a user will identify (step 210) a physical article 130 for which AR content 125 is available. This step may be as simple as the user noticing that the physical article 130 comprises a visible identifier 135. The user may then launch the app 150, which will suitably configure the client device 115 for the following steps.

At step 215, the client device 115 receives image data representative of the physical article 130. The image data may be received from a camera 415 of the client device 115. The received image data may comprise data representative of the identifier 135, i.e. a 'view' of the identifier 135.

At step 220, an identity of the AR content 125 is determined. In some embodiments, this may comprise the user browsing the content site 120, via its client device 115, for AR content 125 associated with a physical article 130, and thus determining the identity of the AR content 125. In other embodiments, it may comprise computing identity information from data representative of the identifier 135, as will be described below with reference to FIGS. 5 to 7.

At step 225, the client device 115 sends a request for the AR content 125 to the server 105, the request including an indication of the determined identity. The indication of the determined identity may comprise a Uniform Resource Locator (URL), and the request may further comprise related information such as the IP address of the client device 115, hardware and software identifiers, usage statistics, cookies, metadata, profiles, and the like.

Referring to FIG. 3, the server 105 receives the request at step 310, and in step 315 retrieves the AR content 125 using the indication of its identity contained in the request. Retrieving the AR content 125 may comprise determining properties of the client device 115 from which the request was sent, and retrieving an appropriate version of the AR content 125. The properties may be determined using the related information contained in the request, or other sources of information available through the communications network 110. For example, properties of the client device 115 may be retrieved from a database in the communications network 110.

At step 320, the server 105 sends a response to the request, the response comprising the AR content 125 corresponding to the request. Suitable delivery methods may include HTTP progressive download (HPD), RTSP streaming delivery (RSD), RTSP via HTML stub (RSDH), and iPhone HTTP streaming (1HS), and may involve redirecting an HTTP request, switching from HTTP to RTSP and/or providing a stub or helper file.

Referring again to FIG. 2, at step 230 the client device 115 receives the response to the request, the response comprising the requested AR content 125.

At step 235, the client device 115 presents an augmented reality view of the physical article 130 on the display 410 of the client device 115. The augmented reality view may be based on the received image data and the AR content 125. The method of presenting the augmented reality view may, in general, be conventional, and will be well understood by those skilled in the art without further description.

In some embodiments, presentation of the AR content 125 is responsive to a user input. Accordingly, an interactive augmented reality view may be presented.

The AR content 125 may be arranged to cause the display 410 of the device 115 to present an invitation for a user to provide the user input. The invitation may comprise a visual and/or audible indication that the user can provide the user input, such as by presenting a flashing icon on the display 410. Presentation of the augmented reality view may be varied in response to receipt of the user input.

For instance, the physical article 130 may be a T-shirt on which is printed an image of a closed door. The AR content 125 may be arranged to cause a flashing frame to be displayed around the closed door in the augmented reality view, as an invitation for a user to provide the user input. If the display 410 of the client device 115 is a touch screen display, the user input may be received as a signal indicative of the user having touched the screen in a position at which the image of the closed door is displayed. In response to the user input, presentation of the augmented reality view may be varied, for example by showing a video of the closed door opening to reveal what is on the other side of the door.

It is envisaged that the system 100 may provide for distribution of large amounts of different AR content 125. Therefore, it would be advantageous to provide physical articles 130 with identifiers 135 by which associated AR content 125 can be conveniently identified. In some embodiments, perhaps where the amount of different AR content 125 permits it, the associated content can be identified by browsing the content site 120 for AR content 125 associated with a physical article 130. However, this is not very convenient in embodiments where there are hundreds of different AR content items 125, for example.

Referring to FIGS. 1 and 4, in embodiments of the invention an identifier system comprises an identifier 135. The identifier 135 comprises a location element 140 and encoded data 145 associated therewith.

As shown in FIG. 1, the location element 140 may comprise a lightening bolt, and the encoded data 145 may comprise a pattern of dashes extending along a line which curves around the location element 140.

As shown in FIG. 4, the identifier system further comprises reference data 430, which is interpretable by the client device 115, or other computer apparatus.

In this embodiment the reference data 430 comprises: a plurality of reference images 435 of the location element 140 associated with different combinations of scale and orientation; a plurality of reference models 440 derived from the reference images 435 and, preferably, from further training images of the location element 140; and decoding information 445 corresponding to each of the reference image 435, suitable for decoding the encoded data 145 into the identity information.

Each of the reference images 435 corresponds to a different viewpoint of the location element 140, and corresponds to a viewpoint "bin" of training images.

Two neighbouring viewpoints may provide collinear views of the location element 140, whereby one view will be a 'scaled up' (and perhaps rotated) version of the other.

Two neighbouring viewpoints may provide views of the location element 140 from different viewing directions (often called 'viewing angles' in common parlance). As a result, one of the views will be a distorted version of the other (e.g., a part of the location element might look like a square in one view and like a rectangle in the other); in the machine vision field, this distortion is often referred to as 'affine warp'.

Each viewpoint bin of training images is centred on the viewpoint of the corresponding reference image 435, and comprises a plurality of 'similar' training images. The reference image 435 and the training images cover a small range of scale and orientation (rotation and viewing direction) of the location element 140. The training images can be generated from the reference image using an affine transformation; each training image corresponds to a different combination of scale, rotation and viewing direction.

Together, the reference images and training images from all of the viewpoint bins cover three octaves of scale, 360 degrees of rotation and any viewing direction having an angle of 20 degrees or less with respect to the perpendicular bisector of the centre point of the location element 140. In other embodiments, the viewpoint bins may cover different ranges of scale, rotation and viewing direction.

Each of the reference models 440 corresponds to one of the reference images 435, in that it is derived, during a training phase, from the images of the viewpoint bin for that reference image 435. In this embodiment, the models 440 are quantised to five discrete intensity levels. Other embodiments may make use of alternative models, which may be simplified representations of the image data in question, and may be derived from more or fewer training images, or solely from the corresponding reference images 435.

Deriving the quantised models 440 involves detecting features in each of the images in the viewpoint bin, identifying one (or more) of the features that can be detected in all (or most) of the images, and deriving a quantised model that can produce a 'match' when compared with a view of the feature, from any of the images in the viewpoint bin. The quantised model is of the appearance of the image data surrounding the feature. Accordingly, the model can be used to detect the corresponding 'real-world' feature at any of the scales or orientations (rotations and viewing directions) covered by the viewpoint bin. The range of combinations of scales and orientations covered by a model includes, and preferably is centred on, the combination of scale and orientation of the corresponding reference image 435. This is in contrast to known systems, such as QR codes, in which there is no such general detection including a quantised model of the appearance of the image data surrounding the feature. (The quantised model is a feature of this embodiment. However, other representations of the local context information around general feature detections may be used instead or in addition to the quantised model.) The overwhelming teaching and prejudice in this field is towards providing a very specific finder pattern in the image data, and using a simple specific finder pattern recognition algorithm which points towards a fixed amount of data relative to the specific finder pattern—this is described further below in relation to the QR code system.

In contrast, as described further below, this invention uses distinct detection and matching techniques to power a code identification scheme allowing a much broader application. In some embodiments, after a first stage of detecting general candidate features (e.g. all possible corners or edges or blobs in an image), there is a second stage of filtering through the candidate features to identify matches to the general features detected in stored reference images. A plurality of such feature matches can then be used to determine precise scale and orientation information for the location element. Optionally, in some embodiments there is a third stage—an optimisation algorithm is used to determine precise scale and orientation information for the location element in scenarios where the location element design does not contain many detectable general features. These stages are described further below.

It will be appreciated that in some embodiments there may be several reference models 440 per reference image 435, and in some embodiments there may be only one reference model 440 per reference image 435, depending on the number of detectable features in the reference image 435 in question. For some reference images 435 there may be more reference models 440 than for other reference images 435. Where there are several reference models 440 per reference image 435, each reference model 440 may represent a different detectable feature of the reference image 435, from different positions within the reference image 435.

A suitable method of deriving the models is described in "Robust feature matching in 2.3 microseconds," Simon Taylor, Edward Rosten and Tom Drummond, in the IEEE CVPR Workshop on Feature Detectors and Descriptors: The State of The Art and Beyond, June 2009 (hereinafter, the "Feature Matching Article").

In other embodiments, instead of each bin including a plurality of images at different rotations, the reference models could be represented using a canonical orientation scheme in order to factor out orientation of the reference images 435 and their corresponding training images. This approach is advantageous in that it would require fewer images to be stored, but if the location element 140 includes only a few (perhaps fewer than ten) detectable corners then there will likely be insufficient redundancy to cope with some of the corners being assigned an incorrect orientation.

Figure 5:
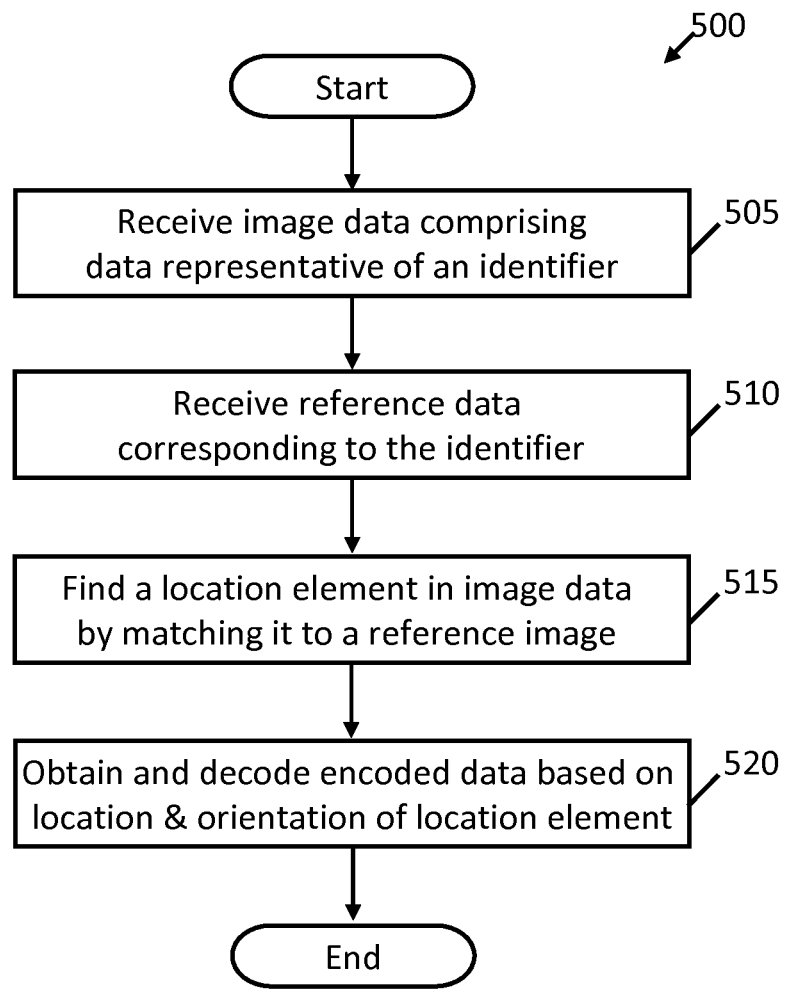
FIG. 5 is a flow chart which shows a method of computing identity information from data representative of an identifier, in accordance with embodiments of the present invention.
Figure 6:
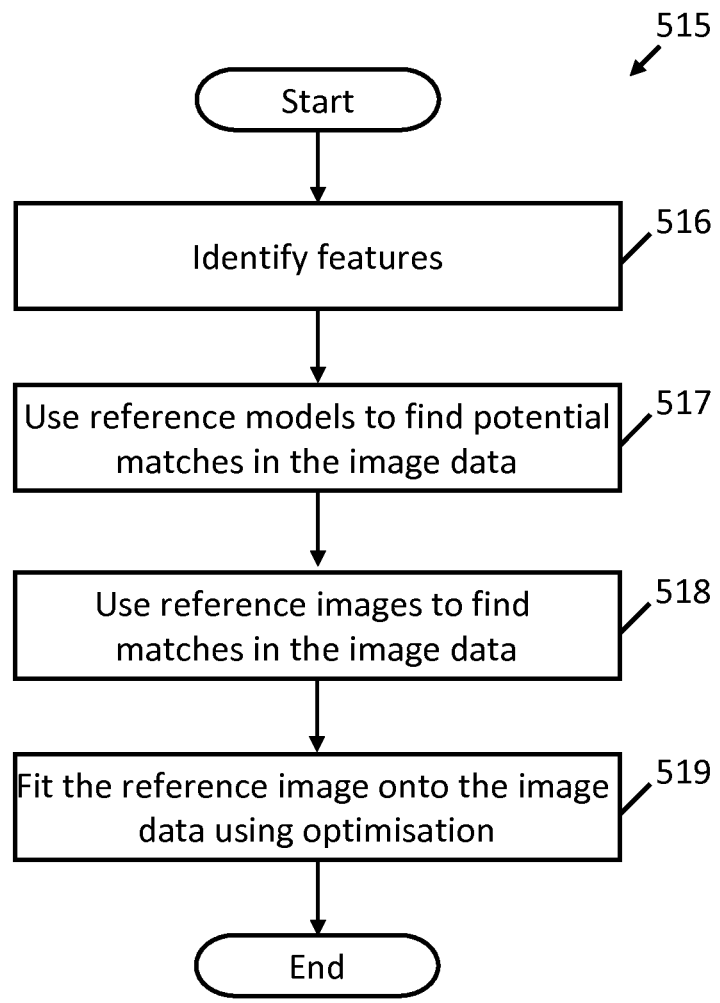
FIG. 6 is a flow chart which shows in more detail the 'find' step shown in FIG. 5.
Figure 7:
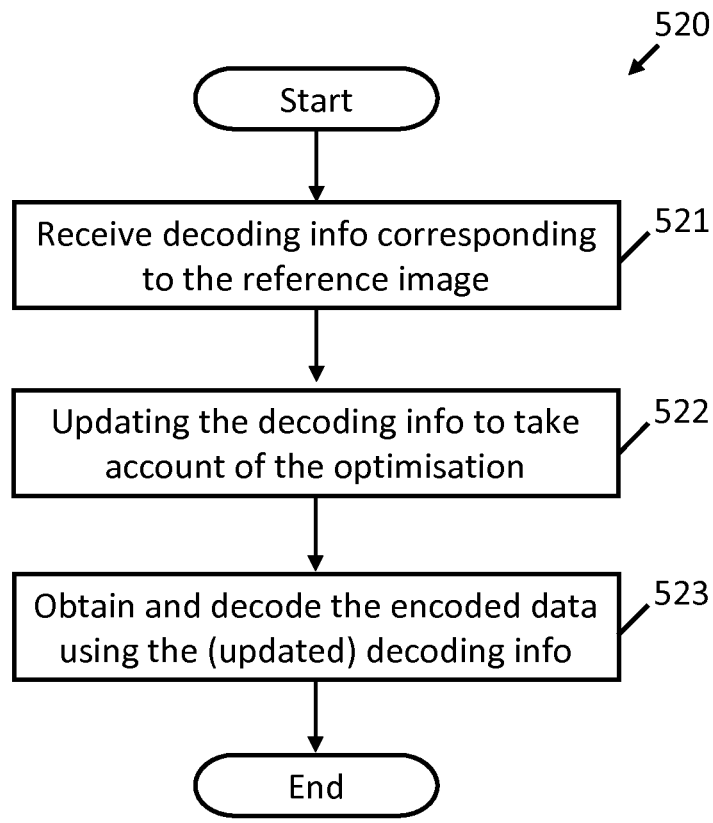
FIG. 7 is a flow chart which shows in more detail the 'obtain' step shown in FIG. 5.

With reference to FIGS. 5 to 7, according to the present embodiment the app 150 is arranged to, when launched, control the client device to carry out a computer implemented method 500 of computing identity information from received image data representative of the identifier 135. Preferably the method is carried out in real-time on live video image data, which means the method is preferably suitable for computing the identity information in less time than the interval between consecutive frames of the live video image data.

The method 500 represents a step away from conventional methods of detecting identifier codes in image data.

Conventionally, an identifier code includes one or more elements which will robustly produce a 'finder pattern' that is detectable in image data representing the identifier code. For instance, in each of three corners of the well known (square) QR code, there are three concentric squares—a black square, which overlays a larger white square, which overlays a yet larger black square—which will robustly produce a finder pattern in image data representing the QR code. This arrangement of squares is designed specifically so that image data representing it will contain a run of pixel values in a recognisable pattern (the finder pattern), namely black-white-black-white-black in the ratios 1:1:3:1:1. This run is part of a 'scan line' through the arrangement of squares, and the recognisable pattern will be present irrespective of the scale and orientation of the arrangement of squares.

In contrast, the present inventive method 500 uses more powerful, general feature matching to identify one or more features (such as corners) of the location element 140 of the identifier 135, and thereby to determine a position and orientation of the identifier 135 in received image data. The inventors have realised that this particular method can be used to provide a wide application—this is against the accepted teaching in this field. The accepted teaching is to constrain the feature matching step as much as possible in order to avoid more complex data processing. The present method provides a particularly efficient balance between providing a wide application and saving resource. Feature matching is a two-step process. 1) Feature detection finds (detects) all locations in an image that have a certain property, such as looking like corners. A plurality of candidate locations is thereby obtained. 2) Using the local context of each feature detection, a matching scheme aims to work out the identity of the corners—i.e. match specific corners in a reference view to some of the candidate corners detected in the input image.

Conventionally identifier schemes are designed around an element that is easily detectable and reasonably unique in the image—e.g. the finder pattern of the QR code or the large black rectangular frame around a code seen in earlier art.

Using the general-purpose feature detection in this invention is different—most images will have many hundreds of "corner-like" points in them (compared to very few parts that match the very specific finder feature pattern of the QR code, for instance). The second "matching" or specific identification phase allows additional context information to be used to identify which of those general features actually match the general features present in the location element. That gives two main benefits: 1) the "location element" can be any textured image in general, providing it contains sufficient detectable "general features" 2) this invention does not aim to find the location element in "one shot" so it does not need to dominate the image or only have a single detectable property (e.g. be a large black square). This is a significant technical difference. As a result the two-step feature detection and identification process allows the precise location of data encoded in an identifier scheme to be obtained from solely the appearance of the location element, which can be all sorts of shapes, including complex shapes. The encoded data 145 is located, for subsequent decoding, by reference to the determined location and orientation of the identifier 135.

"Feature matching" is a well known term of art and is used here in its usual sense, which in this context may be considered to be a comparison of two or more images in order to identify at least one feature (e.g., an edge or a corner) from one of the images which seems to be the same as (i.e., a match for) a feature from another of the images. Thus, embodiments of the invention involve comparing image data with reference images or simplified representations thereof (referred to as 'models') to locate the identifier 135 in image data, so that it may be decoded into identity information.

Referring to FIG. 5, at step 505 of the present method 500, the client device 115 receives the image data. In the description below, the received image data comprises one frame of image data, for example a 320-by-240 pixel frame, from real-time video image data (comprising a sequence of such frames) representative of a view comprising the identifier. The real-time video image data may be received from a camera 415 of the client device 115.

The received data comprises a location element 140 and encoded data 145 associated with the location element 140. References to the 'location element of the received image data' (or similar) and to the 'encoded data of the received image data' (or similar), should be interpreted as references to received image data representative of the location element 140 and the encoded data 145, respectively.

At step 510, the client device 115 receives computer interpretable reference data 430 corresponding to the identifier. Preferably, the reference data 430 was obtained as part of the app 150, and receiving it at step 510 involves retrieving it from memory. In other embodiments, the reference data may be part of a separate 'content package', allowing the app 150 to operate with different identifiers by obtaining the associated content package.

At step 515, the client device 115 locates the location element 140 in the received image data. To do so, it compares one or more parts of the received image data with one or more reference images 435 of the location element 140.

Each of the reference images 435 of the location element 140 is associated with different combinations of scale and orientation. Therefore, matching a part of the received image data with a part of a reference image (or the whole reference image) determines not only the position of the location element 140 in the received image data, but also an approximation of its scale and orientation (which will be similar to, or the same as, the scale and orientation of the matching reference image 435).

Referring to FIG. 6, locating the location element 140 comprises identifying, at step 516, features in the received image data.

Identifying features is preferably done using one or more feature detection algorithms to detect edges and/or corners. One suitable method of identifying edges and/or corners is described in "Machine learning for high speed corner detection," E. Rosten and T. Drummond, in 9th European Conference on Computer Vision, volume 1, pages 430-443. That method will produce a set of x, y coordinates which represent the positions of the corners identified in the received image data. In the present embodiment, step 516 typically returns x, y coordinates for hundreds of corners detected in the received image data.

At step 517, the client device 115 uses the reference models 440 to identify a set of potential matches between features of one or more of the reference images 435 and the features identified (at step 516) in the received image data.

To identify the set of potential matches, the client device 115 first obtains a quantised model of each of the features identified (at step 516) in the received image data (in substantially the same manner as the reference models 440 are obtained), and then compares each of the obtained models with the reference models 440. A suitable method of deriving and comparing the models is described in the Feature Matching Article (see above for full citation).

The comparison between N models of the features identified (at step 516) in the received image data and M reference models 440 may be performed as follows. Compare each of the N obtained models with each of the M reference models 440, and if any comparison produces a match then add a pair of identifiers to the set of potential matches, the pair denoting a feature identified (at step 516) in the received image data and its matching reference model 440.

Optimised search strategies may be used to avoid comparing each obtained model with all of the reference models 440, i.e. to reduce the total number of comparisons to fewer than N×M comparisons. For example, similar reference models 440 may be grouped together, and a 'parent' model may be created to represent one or more common characteristics of the 'children' (i.e. the similar reference models 440). In some cases, this allows an obtained model to be disregarded after comparing it with a parent model, without comparing it with the children, resulting in fewer comparisons overall.

Another optimised search strategy, which may be used in some embodiments, is based on indexing using a hash function, e.g. as described in the Feature Matching Article (see above for full citation). The hash function is used to generate a hash value for the area surrounding a feature in the training images, and those values (or the most common values, which may account for, say, 80% of all of the generated hash values) are used for indexing the reference models. Reference models corresponding to the same hash value are grouped together into an index associated with the hash value. At runtime, a quantised model of a feature is identified (at step 516) in the received image data and a hash value of the area surrounding the feature is generated. The client device compares the obtained quantised model with the reference models associated with the generated hash value, instead of comparing it with all of the reference models.

It is noted that comparing quantised models of image data is an indirect way of comparing the image data itself, and is more efficient than a direct pixel-by-pixel comparison of the image data. Comparing two models can be done in fewer operations than a corresponding pixel-by-pixel direct comparison of two patches of image data, and the quantised models require less storage space than the corresponding patches of image data. A further advantage of the models used in embodiments of the invention is that they provide a degree of tolerance to changes in scale and/or orientation, because they are derived from a plurality of images which cover a small range of scale and orientation (as described above).

Step 517 may be sufficient to reliably determine an estimated scale and orientation of the location element 140, which requires location of at least three different features of the location element 140 in the received image data to be matched to the corresponding features of a reference image 435 (in order to constrain six degrees of freedom, namely rotation and translation with respect to the x, y and z axes). In practice, reliably matching three different features can be achieved if the location element 140 accounts for a considerable proportion of the received image data (perhaps 30% or more), and/or if the location element 140 contains tens of detectable features such as edges and corners. Where the location element 140 will account for a smaller proportion of the received image data, and/or will have fewer detectable features, the next step (step 518) can be used as an additional step to reliably determine an estimated scale and orientation of the location element 140. That is, the next step allows the method to be used with a location element 140 which might have been thought unsuitable due to having too few detectable features such as corners, which allows the method to be used with location elements 140 having 'eye appeal' rather than having their appearance dictated by function. In particular, "eye appeal" applies to both those location elements with many corners and those with few, as a consequence of the two-stage detection and matching process that doesn't impose a specific design on the location element but simply that it contains enough detectable general features. Step 518 can simply reduce the threshold for "enough" detectable features compared to step 517. These steps 518, 519 (described further below) are not disclosed in the Feature Matching Article (see above).

This ability to provide eye appeal or bespoke design for any other reason, including any technical reason, is in contrast to the specific location element design of something like the QR code, where the design of the location element is forced by the detection algorithm.

At step 518, the client device 115 compares different parts of the received image data with one or more of the reference images 435. More specifically, the client device 115 uses direct comparisons between parts of the received image data and some of the reference images 435 to identify a single matching reference image 435 (or a small number of matching reference images 435) from the set of potential matches obtained during step 517.

To do this, the client device 115 obtains the different parts of the received image data, each part comprising a respective one of the features denoted by the identifier pairs of the set of potential matches. Generally each part is larger than the feature and its relevant surrounding context used in the model comparison step, including additional surrounding image data. In some, but not all, examples, the part may comprise the full reference image. The client device 115 also retrieves the reference image(s) 435 that each of the obtained different parts of the received image data is to be compared with, i.e. the reference image(s) corresponding to the reference models 440 denoted by the identifier pairs. (Recall that for each of the reference images 435 there is at least one corresponding reference model 440 which represents, in simplified form, a detectable feature of the reference image in question.)

It will be appreciated that the number of comparisons involved in step 518 corresponds to the number of potential matches determined in step 517. Therefore, step 518 typically involves far fewer comparisons than step 517, because the number of potential matches identified in step 517 should be far less than, e.g., N×M.

The comparisons of step 518 may involve comparing an entire reference image 435 with a part of the received image data, the part being of the same size as the reference image 435. This would be a good choice where the reference image 435 is small, say smaller than fifty-by-fifty pixels, and/or has relatively few readily-detectable features such as corners, say fewer than ten.

Alternatively, the comparison of step 518 may involve comparing part of a reference image 435, say half of the reference image or less, with a part of the received image data of the same size.

Unlike comparison of quantised models, as in step 517, the direct comparison at step 518 involves a pixel-by-pixel comparison of a reference image 435 with part of the received image data. Each comparison may involve computing respective similarity measures, requiring at least as many operations as there are pixels in the part of the received image data being compared. For example, the pixel-by-pixel comparison may involve computing a sum of absolute differences value, whereby a value of zero indicates that the compared images are the same. Clearly this is more computationally expensive than the comparison of models, which is an advantage of using an initial step of comparison based on models in order to reduce the number of direct comparisons of image data.

Following the comparisons, the client device 115 determines a match (or several matches, perhaps no more than five matches) between a part of the received image data and a reference image 435, based on the 'best' of the respective similarity measures resulting from each of the comparisons. For example, each comparison may produce a respective sum of absolute differences score, the lowest score identifying the match (or the several lowest scores below a threshold identifying the matches).

The client device 115 may derive the location of the location element 140 in the received image data from the location of the matching part of the received image data. For example, an x, y coordinate of a central pixel of the matching part of the received image data may be taken to be the location of the centre of the location element 140 in the received image data. This is not always true; for example, if the comparison only involves the left half of the reference location image then the center of the matching part will not be assumed to be the center of the location element.

The client device 115 may derive the scale and orientation of the location element 140 in the received image data from the scale and orientation associated with the matching reference image 435.

At step 519, optionally, the client device uses an optimisation algorithm to fit the matching reference image 435 onto the matching part of the received image data. That is, the client device uses an optimisation algorithm to identify a change of scale and/or orientation for fitting the reference image 435 onto the location element 140 of the received image data (or vice versa).

A goal of the optimisation algorithm is to determine a change of scale and/or orientation which would reduce to zero a measure of similarity between the matching reference image 435 and the received location element 140. For example, the algorithm may be a Gauss-Newton algorithm with the goal of reducing to zero the sum of squared differences between the matching reference image 435 and the received location element 140. For avoidance of doubt, it is noted that the optimisation algorithm might not achieve its goal of reducing the measure of similarity to zero.

To reduce the computational burden involved with the optimisation algorithm, the algorithm may operate on a 'sparse sample' of the reference image 435, and a corresponding 'sparse sample' of the location element 140 of the received image data, in order to identify a change of scale and/or orientation for fitting the reference image onto the location element 140 or vice versa. It is noted that, a sparse sample of the reference image 435, and of the location element 140 of the received image data, is one in which the majority of pixels are not sampled; it does not require a specific pattern of sampled pixels. A heuristic model may be used for deriving appropriate sparse samples, so that the sampled pixels are spread over a large proportion of the received image data and are located near step changes in intensity value where possible.

Referring back to FIG. 5, at step 520 the client device decodes the encoded data 145 into the identity information using decoding information 445 associated with the matching reference image 435, or with the matching reference model.

Referring now to FIG. 7, at step 521 the client device receives decoding information 445 associated with the matching reference image 435, which comprises retrieving it from memory.

The decoding information 445 specifies a position, relative to the position, scale and orientation of the location element 140, where the encoded data 145 can be obtained. Since the decoding information 445 is associated with the matching reference image 435, its position will be specified relative to the scale and orientation of the matching reference image 435, which is an approximation of the scale and orientation of the location element 140 in the received image data; its position will be specified relative to the derived location of the location element 140 in the received image data. That is, the client device uses the location and orientation of the location element 140 in the received image data to obtain the encoded data.

At step 522, optionally, the client device updates the decoding information 445 to take account of any change of scale and/or orientation identified at step 519. In particular, the specified position will be updated to take account of the change of scale and/or orientation suitable for fitting the matching reference image 435 onto the location element 140 in the received image data, or vice versa.

At step 523 the client device obtains the encoded data 145 from the specified position relative to the location element 140, and compares the encoded data 145 with one or more reference decoding values in order to decode it into the identity information. For example, the reference decoding values may specify a plurality of discrete values to which the obtained encoded data 145 is quantised, and the corresponding values into which they should be decoded. The present embodiment is based on a simple example, in which the decoding information 445 specifies the positions along the line of dashes (see above) from where the encoded data 145 can be obtained, and a black pixel is decoded as a '1' and a white pixel is decoded as a '0'.

Those skilled in the art may appreciate numerous alterations and modifications to the foregoing embodiments which nevertheless fall within the scope of the following claims.

The invention claimed is:

1. A computer implemented method of presenting an augmented reality view of a physical article, comprising:
   receiving image data representative of a physical article for which augmented reality content is available;
   determining an identity of the augmented reality content;
   sending a request for the augmented reality content, the request including comprising an indication of the determined identity;
   receiving a response to the request, the response comprising the augmented reality content; and
   presenting an augmented reality view of the physical article based on the image data and the augmented reality content, wherein
   the physical article comprises an identifier,
   the image data comprises data representative of the identifier, and
   the determining of the identity of the augmented reality content comprises computing identity information from the data representative of the identifier,
   the identifier comprises a location element and encoded data associated with the location element, and
   the computing of the identity information comprises:
      receiving the image data,
      receiving computer interpretable reference data corresponding to the identifier,
      using feature matching based on the reference data to determine a location and a scale and orientation of the location element in the received image data,
      using the determined location, scale and orientation of the location element to locate the encoded data for subsequent decoding into identity information, and
      decoding the resulting encoded data into the identity information.

2. The method according to claim 1, wherein the computing of the identity information further comprises:
   detecting candidate features in the image data; and
   identifying, using local context information, one or more specific features from the detected candidate features to determine the location and orientation of the location element.

3. The method according to claim 1, wherein the reference data comprises a reference model of at least part of the location element, and the feature matching comprises obtaining a model of a part of the received image data and comparing the model with the reference model to determine whether the model matches the reference model.

4. The method according to claim 3, wherein the reference data comprises a further reference model of the at least part of the location element, each of the reference models corresponding to a different combination of scale and orientation of the location element, and the feature matching comprises comparing the model of a part of the received image data with the further reference model to determine whether model matches the further reference model.

5. The method according to claim 3, wherein the feature matching comprises:
   disregarding a potential match in response to determining that the model of a part of the received image data does not match the reference model or the further reference model.

6. The method according to claim 3, further comprising:
   deriving the location of the location element from the location of the part of the received image data when the model thereof was determined to match the reference model, or the further reference model, and/or when the part of the received image data was determined to match the reference image or the further reference image.

7. The method according to claim 3, further comprising:
   deriving the scale and orientation of the location element from the scale and orientation associated with the reference model, or the further reference model, when the obtained model of the part of the received image data was determined to match the reference model, or the further reference model, respectively.

8. The method according to claim 7, wherein the determining of the scale and orientation of the location element comprises:
   using an optimization algorithm to change the derived scale and/or orientation to fit the location element of the received image data onto a matching reference image, the matching reference image being whichever one of the reference images was determined to match the part of the received image data and/or the reference image corresponding to whichever one of the reference models was determined to match the model of the part of the received image data.

9. The method according to claim 8, wherein the reference data comprises a sparse sample of the reference image, or respective sparse samples of the reference images, each sparse sample being suitable for use with a corresponding sparse sample of the location element of the image data.

10. The method according to claim 1, wherein the reference data comprises a reference image of the location element, and the feature matching comprises comparing a part of the received image data with image data from the reference image to determine whether the part of the received image data matches the reference image.

11. The method according to claim 10, wherein the reference data comprises a further reference image of the location element, each of the reference images corresponding to a different combination of scale and orientation of the location element, and the feature matching comprises comparing the part of the received image data with image data from the further reference image to determine whether the part of the received image data matches the further reference image.

12. The method according to claim 11, wherein the further reference image corresponds to the further reference model and the part of the received image data is compared with the image data from the further reference image when the potential match between the part of the received image data and the further reference model has not already been disregarded.

13. The method according to claim 10, wherein the reference image corresponds to the reference model and the part of the received image data is compared with the image data from the reference image when the potential match between the part of the received image data and the reference model has not already been disregarded.

14. The method according to claim 10, further comprising:
   deriving the scale and orientation of the location element from the scale and orientation associated with the reference image, or the further reference image, when the part of the received image data was determined to match the reference image, or the further reference image, respectively.

15. The method according to claim 1, wherein the reference data comprises decoding information that specifies a location relative to the location element from which the encoded data can be obtained.

16. The method according to claim 15, wherein the decoding information specifies one or more decoding reference values for comparison with the encoded data in order to decode the encoded data into the identity information.

17. An augmented reality content distribution system configured to present an augmented reality view of a physical article, comprising:
   a client device comprising a computer processor operatively coupled to a camera and a display;
   a physical article for which augmented reality content is available, the physical article comprising an identifier, the identifier comprising a location element and encoded data associated with the location element; and
   a server configured to store augmented reality content associated with the physical article,
   wherein the computer processor is configured to:
      receive image data from the camera, the image data being representative of the physical article and comprising data representative of the identifier,
      determine an identity of the augmented reality content by computing identity information from the data representative of the identifier,
      send a request to the server for the augmented reality content, the request comprising an indication of the determined identity,
      receive a response to the request, the response comprising the stored augmented reality content, and
      present an augmented reality view of the physical article on the display, based on the image data and the augmented reality content, and
   the computing of the identity information comprises:
      receiving the image data,
      receiving computer interpretable reference data corresponding to the identifier,
      using feature matching based on the reference data to determine a location and a scale and orientation of the location element in the received image data,
      using the determined location, scale and orientation of the location element to locate the encoded data for subsequent decoding into identity information, and
      decoding the resulting encoded data into the identity information.

* * * * *